United States Patent
Fraser et al.

(10) Patent No.: US 10,065,641 B2
(45) Date of Patent: Sep. 4, 2018

(54) BRAKE FADE AND BRAKE CAPACITY BASED POWERTRAIN OPERATION

(71) Applicant: Ford Global Technologies, LLC, Dearborn, MI (US)

(72) Inventors: John G. Fraser, St. Joachim (CA); Andrew Denis Lewandowski, Sterling Heights, MI (US); Lawrence Robert Rhein, China, MI (US); Jason Christopher Matthews, Farmington Hills, MI (US); Jeremy Mateyk, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 354 days.

(21) Appl. No.: 15/130,082

(22) Filed: Apr. 15, 2016

(65) Prior Publication Data
US 2017/0297573 A1 Oct. 19, 2017

(51) Int. Cl.
*B60W 10/10* (2012.01)
*B60W 10/18* (2012.01)
*B60W 30/14* (2006.01)

(52) U.S. Cl.
CPC .......... *B60W 30/143* (2013.01); *B60W 10/10* (2013.01); *B60W 10/18* (2013.01); *B60W 2510/18* (2013.01); *B60W 2510/184* (2013.01)

(58) Field of Classification Search
CPC .... B60W 10/10; B60W 10/18; B60W 30/143; B60W 30/146; B60W 2510/18; B60W 2510/184
See application file for complete search history.

(56) References Cited

U.S. PATENT DOCUMENTS

| | | | |
|---|---|---|---|
| 6,233,514 B1 | 5/2001 | Claussen et al. | |
| 6,254,510 B1 * | 7/2001 | Rauch | B60W 10/06 477/132 |
| 6,625,535 B2 | 9/2003 | Han et al. | |
| 7,009,508 B2 | 3/2006 | Vertenten | |
| 8,731,795 B2 | 5/2014 | Frashure et al. | |
| 2003/0036839 A1 * | 2/2003 | Han | B60T 8/18 701/70 |

(Continued)

FOREIGN PATENT DOCUMENTS

| | | |
|---|---|---|
| CN | 204440188 U | 7/2015 |
| DE | 102005045488 A1 | 4/2006 |
| KR | 20060063113 A | 6/2006 |

*Primary Examiner* — Edwin A Young
(74) *Attorney, Agent, or Firm* — Frank A. MacKenzie; Brooks Kushman P.C.

(57) ABSTRACT

A cruise control system for a vehicle includes a controller configured to maintain a speed of the vehicle about a setpoint, and in response to predicted brake capacity falling below a threshold based on predicted brake fade, reduce the setpoint and downshift a transmission of the vehicle to increase negative torque to reduce brake fade. Also, a powertrain of a vehicle includes an engine, an automatic transmission coupled with the engine, and a controller. The controller is configured to maintain a speed of the vehicle about a setpoint, and in response to a predicted brake capacity falling below a threshold based on predicted brake fade, reduce the setpoint and downshift the transmission to increase a negative torque.

20 Claims, 4 Drawing Sheets

(56) References Cited

U.S. PATENT DOCUMENTS

| | | | |
|---|---|---|---|
| 2004/0015283 A1* | 1/2004 | Eckert | B60T 8/00 701/70 |
| 2009/0043470 A1* | 2/2009 | Ahn | B60W 10/04 701/70 |
| 2015/0027823 A1 | 1/2015 | Murata et al. | |

* cited by examiner

BRAKE FADE AND BRAKE CAPACITY BASED POWERTRAIN OPERATION

TECHNICAL FIELD

This disclosure generally relates to methods and apparatus of controlling a powertrain of a vehicle based on available brake capacity derived from a predicted brake fade.

BACKGROUND

Many vehicles are equipped with automatic braking systems that use friction between a rotor and a brake lining, where the brake lining is on a brake pad, or friction between a drum and a brake lining, where the brake lining is on a brake shoe. One characteristic of friction brakes is a fading of vehicle braking system performance, or brake fade. Brake fade is a reduction in stopping power that may occur after repeated or sustained application of a friction brake. Brake fade is caused by a buildup of heat in the friction material of the brakes including the brake lining, brake rotor, brake drum, or brake fluid. A loss of stopping power, or fade, may be caused by friction fade or fluid fade. Brake fade often occurs during travel down a long, steep decline. Disc brakes are more resistant to brake fade because heat can be vented away from the rotor and pads, while drums tend to hold in the heat.

Also, many vehicles are equipped with an adaptive cruise control (ACC) system. The ACC, working with conventional engine based speed control, may automatically apply vehicle friction brakes to maintain a constant speed or following distance. The ACC of a vehicle traveling down a hill or following a different vehicle may actively decelerate the vehicle by reducing the power output of the engine, or applying the vehicle brakes to maintain a speed of the vehicle or a distance between the vehicle and the other vehicle. A continual application of a friction brake, for example, during a downhill following mode may overwork the friction brakes and lead to brake fade. In order to avoid brake fade, some ACC systems are designed to disengage when the friction brakes exceed a temperature.

SUMMARY

A cruise control system for a vehicle includes a controller. The controller is configured to maintain a speed of the vehicle about a setpoint, and in response to predicted brake capacity falling below a threshold based on predicted brake fade, reduce the setpoint and downshift a transmission of the vehicle to increase negative torque to reduce brake fade.

A powertrain of a vehicle includes an engine, an automatic transmission coupled with the engine, and a controller. The controller is configured to maintain a speed of the vehicle about a setpoint, and in response to a predicted brake capacity falling below a threshold based on predicted brake fade, reduce the setpoint and downshift the transmission to increase a negative torque.

A method of controlling a powertrain of a vehicle includes, in response to a predicted capacity of vehicle brakes decreasing below a predetermined level, reducing, by a controller, a vehicle speed setpoint, applying friction brakes of the vehicle to reduce the vehicle speed to the setpoint, and downshifting a transmission, wherein the predicted capacity is based on a temperature associated with a friction material of the vehicle brakes and a predicted brake fade threshold derived from a speed, mass, and current angle of inclination of the vehicle.

DETAILED DESCRIPTION

Figure 1:
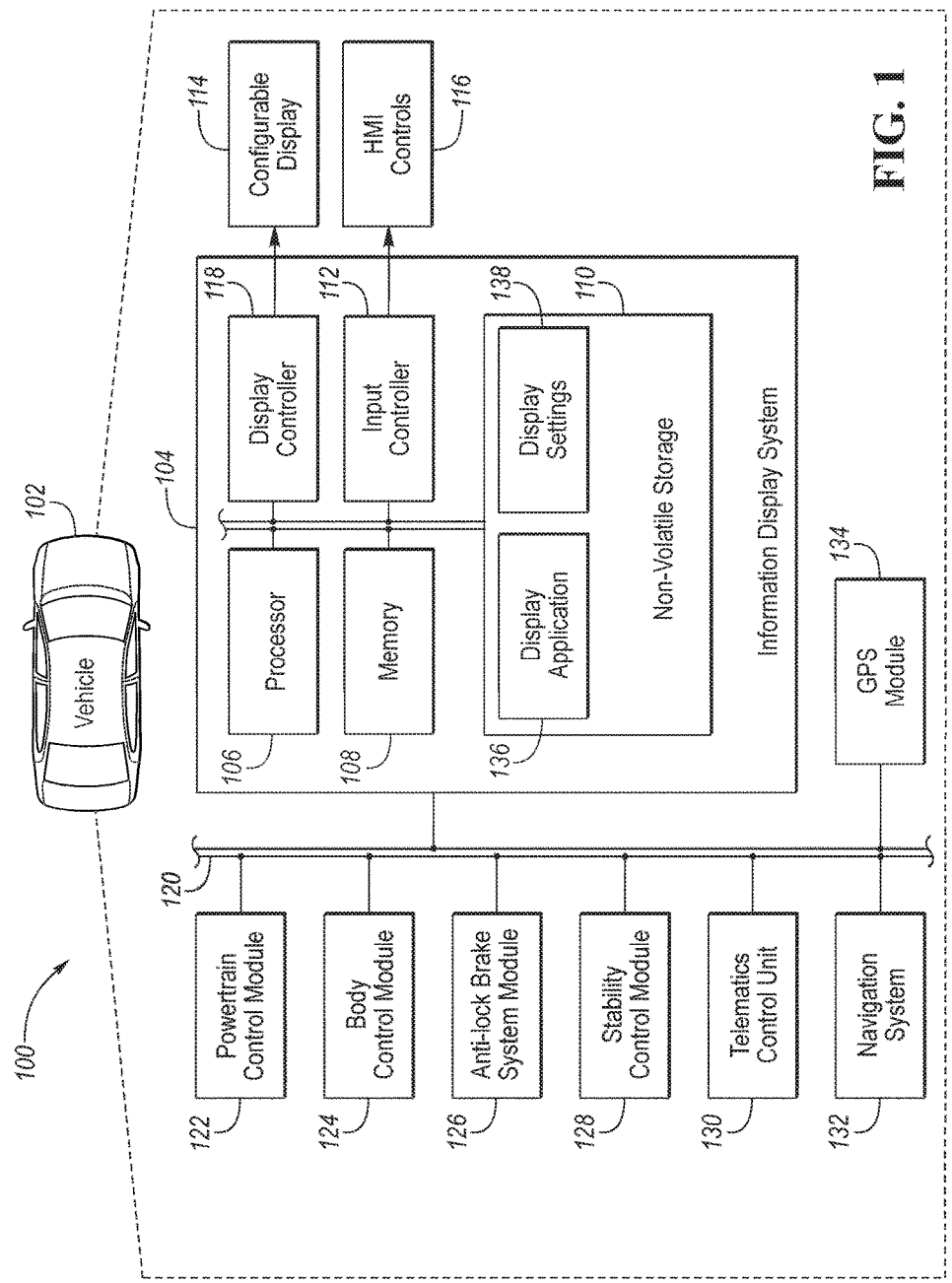
FIG. 1 illustrates a vehicle computing system including a configurable display to facilitate communication of information with a driver.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The basic principle of how brakes work is the same for most vehicles. This principle is the Conservation of Energy, which is that energy is neither created nor destroyed, but is only converted from one form to another. Friction brakes are energy converters; they convert kinetic energy (e.g., motion) into heat energy through friction between either a brake lining and brake drum surface, or a brake lining and brake rotor surface. A friction surface is the surface of the rotating brake component (e.g., brake drum or brake rotor) with the brake pad (e.g., brake lining). The amount of heat produced by a brake system is directly related to the mass of the vehicle and the force applied to the brake pad against the rotating brake component. Heat energy is generally measured in British Thermal Units (BTUs), and the amount of BTUs produced by the brake system is the result of the amount of kinetic energy that is being converted. Kinetic Energy=½ m·V² in which m is the mass and V is the velocity. The amount of energy that the brake must convert to heat is doubled by doubling a vehicle's mass and quadrupled by doubling its velocity.

Here, two operating modes are explored with respect to brake fade due to thermal saturation, normal driving operation and adaptive cruise control. When a driving event occurs in which the brakes saturate their thermal capacity, often the brakes are no longer able to provide an effective braking force. During downhill driving under normal operation, the driver has a couple options if he or she wishes to maintain a constant speed. The driver could use manual override and force the transmission into a lower gear. The lower gear would provide better engine braking because of the increased RPM. If the vehicle is equipped with an engine brake, the effect would be even greater. The driver could also choose to regulate his or her speed with using the friction brakes. Best practice is to pump or snub the brakes allowing a large decrease in speed without over heating the brakes. There is nothing that forces the driver to do this and in regular transmission mode, this will not force any downshifts. A driver could also place the vehicle in "Tow/Haul" mode which allows grade braking downshifts. The downshift logic for these shifts is based off of velocity of the brake pedal and brake pressure achieved. If the driver were to snub the brake, then a downshift would likely be fired off. If the driver maintains a high brake pressure, multiple downshifts would occur.

However, none of the aforementioned methods of speed control can fully protect the driver from saturating the thermal brake capacity. Even in tow/haul mode, a driver is still able to apply light brake pressure to maintain speed while not causing the transmission to downshift. By using a thermal capacity model, transmission logic can be developed to force the transmission to downshift when the vehicle is approaching the thermal capacity limit. By forcing the downshift, it allows for the powertrain to provide some of the braking fore requested by the driver.

When adaptive cruise control is active, the vehicle applies friction brakes automatically and downshifts are determined using different logic. With adaptive cruise control active, the transmission logic uses a brake counter which is based off of brake pressure and time. At higher brake pressures, the counter counts quicker than at lower brake pressure. The exact graph is determined by the transmission calibrator. Once the counter reaches a certain limit, set by the calibration engineer, the transmission will downshift. This is one method to alleviate hydraulic brake requirements. However, this method does not take into account the actual thermal capacity of the braking system. It is based on customer satisfaction and a vehicle engineer's determination of how the system should function.

In adaptive cruise control mode, the thermal capacity downshift logic could be an extra safeguard that overrides the existing downshift logic. Again, using a thermal capacity model, the transmission logic could import the value of the model into the transmission control module (TCM) and a limit may be set in the transmission logic. When the thermal capacity reaches that limit a downshift may be requested.

In fact, it may be beneficial to include a predicted thermal capacity signal. This signal may use the current thermal capacity and current rate of change of thermal capacity. Using both of these signals, the TCM could predict the point of thermal saturation and therefore the predicted downshift point.

For both normal driving operation and adaptive cruise control driving situations, this logic may overwrite all other downshifts algorithms.

In addition, this logic may be expanded, for instance, during adaptive cruise control, if the vehicle speed is set such that a down shift is not possible in the current gear, the system may snub the brake to a lower speed where a downshift is possible.

In some cases, a single downshift may not be enough to alleviate the friction brake requirements also referred to as hydraulic brake requirements. Once a downshift occurs, the logic may again assess the rate of change of thermal capacity. If it continues to increase after a downshift, the system may be set up to command another downshift. The system may continue to do this until the rate of change of thermal capacity is negative.

In general, brake fade may be broken down into four main categories including: friction fade, mechanical fade, fluid fade, and domino fade.

Friction fade is the mechanism used to convert kinetic energy into heat in a brake system. Friction is the resistance of motion between two objects that are in contact with each other. If friction at the friction surface is reduced to an unacceptable level, the ability to convert kinetic energy into heat will also be reduced. When a reduction in the friction at the friction surface occurs as the result of heat it is called Friction Fade. When friction fade occurs in a hydraulic brake system, the pedal will still feel hard to the driver, but he will notice a difference in the braking response of the vehicle. For air-braked vehicles, when friction fade occurs, the driver may report the pedal going to the floor. Brake friction is affected by the temperature at the friction surface. The heat/friction profile is different from lining to lining and can be linear or curvilinear. Either brake lining friction can gradually decline (linear) as heat builds in the brake, or alternatively, lining friction can build-up until it reaches a peak, then quickly begins to decrease (curvilinear).

Mechanical Fade is most commonly associated with drum brakes and not disc brakes. In a drum brake, the application of the lining is outward toward the rotating drum's friction surface. As the brake drum heats up, it expands outward. This expansion will increase the drum's diameter, moving it away from the lining application. The expansion of the brake drum causes a need for increased lining travel and increased travel of the application device. If expansion is great enough, it can cause the application device to bottom out and the brakes to fail. A disc brake lining application is at a right angle to the rotating disc and expansion of the disc is outward toward the application rather than away from it. For this reason disc brakes have better fade resistance.

Fluid fade is related to a hydraulic brake system that works by using a non-compressible fluid (brake fluid) to transmit the force of a driver pushing on the brake pedal to the brake linings. Air and vaporized fluid are compressible and, if allowed into a hydraulic brake system, the brake pedal will feel spongy and the force transmitted to the lining will be reduced. Just like water, brake fluid can boil and change to a vapor if it gets hot enough. Fluid Fade is the overheating of brake fluid causing it to vaporize. The vaporized fluid will have to be compressed before the system can transmit pedal force to the lining. In most cases, there will be insufficient pedal travel to do both.

Domino Fade occurs when some brakes in the system have more brake torque than the others. This imbalance may be the result of poor maintenance, poor load distribution, or light brake applications. The brakes producing more negative torque will heat up much quicker than they should, which may cause them to fade. If the high torque brakes fail, the other brakes will then receive a disproportionate amount of heat. These now overloaded brakes will also likely fail, hence the domino effect.

One embodiment of the brake capacity includes a variable of the brake capacity in which the magnitude of the variable is based on a difference between a temperature of brake material and a temperature threshold at which brake fade occurs offset by a predicted rise in temperature of brake material. The predicted rise in brake material may be a static determination based on vehicle speed, vehicle weight, and an inclination of the vehicle. A more comprehensive determination of the predicted rise in brake material may include a change in elevation, a predicted duration that the brakes will be applied, a route from a navigation system indicating a future desired speed and a change in elevation along the route. Based on the brake capacity, a driver may be able to take an informed course of action before a critical situation occurs. For example, if a driver of a vehicle traveling on a steep downhill mountain highway is informed of a potential brake fade situation along a planned route, the driver may choose to exit the highway to stop the vehicle and allow the brake material to cool. Another embodiment may include a needle that articulates in response to a temperature of brake material and a temperature threshold at which brake fade occurs. Also, an embodiment may include a friction coefficient of brake material or a profile of a friction coefficient of brake material with respect to temperature. The friction coefficient of brake material or profile of the friction coefficient of brake material may be monitored and updated based on historical brake force applied and a resultant brake force. The brake force applied may be based on a brake pedal position or a brake fluid pressure. The resultant brake force may be based on many factors including a speed profile of the vehicle, an angle of inclination of the vehicle, a change in elevation of the vehicle, or a weight of the vehicle.

Brake capacity may be desired to be monitored while traversing a steep decline, towing a trailer, or operating a performance vehicle on a closed course such as racing, and brake capacity may not be desired to be monitored while traveling at slow speeds with little or no inclination or predicted change in elevation.

FIG. 1 illustrates an example 100 of a vehicle 102 including a configurable display 114 to facilitate communication of information with a driver. The vehicle 102 may include various types of passenger vehicle, such as crossover utility vehicle (CUV), sport utility vehicle (SUV), truck, recreational vehicle (RV), boat, plane or other mobile machine for transporting people or goods. It should be noted that the illustrated vehicle 102 is merely an example, and more, fewer, and/or differently located elements may be used.

An information display system 104 of the vehicle 102 may include one or more processors 106 configured to perform instructions, commands and other routines in support of the processes described herein. For instance, the information display system 104 may be configured to execute instructions of a display application 136 based on display settings 138 loaded to a memory 108 to provide information display features such as trip counters, fuel economy, fuel history, digital speedometer, engine information, or a brake capacity. Such instructions and other data may be maintained in a non-volatile manner using a variety of types of computer-readable storage medium 110. The computer-readable medium 110 (also referred to as a processor-readable medium or storage) includes any non-transitory medium (e.g., a tangible medium) that participates in providing instructions or other data that may be read by the processor 106 of the information display system 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The information display system 104 may be provided with various features allowing the vehicle occupants to interface with the information display system 104. For example, the information display system 104 may include an input controller 112 configured to receive user input from one or more human-machine interface (HMI) controls 116 of the vehicle 102 providing for occupant-vehicle interaction. These may include one or more buttons, knobs, or other controls configured to invoke functions on the information display system 104. The information display system 104 may also drive or otherwise communicate with one or more configurable displays 114 configured to provide visual output to vehicle occupants by way of a display controller 118.

The configurable display 114 may be disposed within a dashboard of the vehicle such as within the instrument panel cluster. In other examples, the configurable display 114 may be part of another display system, such as the navigation system, or may be part of a dedicated information display system elsewhere in the vehicle 102. The configurable display 114 may be a liquid crystal display (LCD), a plasma display, an organic light emitting display (OLED), or any other suitable display. In some cases, the configurable display 114 may be a touch screen further configured to receive user touch input via the display controller 118, while in other cases the configurable display 114 may be a display only, without touch input capabilities, such as when included within the instrument cluster behind the steering wheel.

The information display system 104 may be further configured to communicate with other components of the vehicle 102 via one or more in-vehicle buses 120. The in-vehicle buses 120 may include one or more of a vehicle controller area network (CAN), an Ethernet network, and a media oriented system transfer (MOST), as some non-limiting possibilities. The in-vehicle buses 120 may allow the information display system 104 to communicate with other systems within the vehicle 102. The exemplary vehicle systems described in detail below may communicate with the information display system 104 over an in-vehicle bus 120. In other examples, the information display system 104 may be connected to more or fewer in-vehicle buses 120, and one or more HMI controls 116 or other components may be connected to the information display system 104 via in-vehicle buses 120 or directly without connection to an in-vehicle bus 120.

In an example, a powertrain control module 122 may be a component in communication with the information display system 104, and may be configured to provide information to the information display system 104 regarding control of engine operating components (e.g., idle control, fuel delivery, emissions control, engine diagnostic codes, engine RPM, etc.). A body control module 124 may be configured to manage various power control functions such as exterior lighting, interior lighting, keyless entry, remote start, connection of trailer lights, depression of a brake pedal, and provide information to the information display system 104 such as point of access status information (e.g., closure status of the hood, doors and/or trunk of the vehicle 102). An anti-lock brake module 126 may be configured to provide control and monitoring of brake system components, as well as to provide information to the information display system 104 regarding the components (e.g., master cylinder pressure, brake fluid level, brake force applied, brake fluid temperature, etc.). A stability control module 128 may be configured to perform functions such as active suspension control, traction control, and brake control, and provide sensed vehicle dynamics information to the information display system 104, such as roll angle, pitch angle, yaw rate, roll rate, pitch rate, lateral and longitudinal velocity, lateral and longitudinal acceleration, tire slip, tire slip rate, and an infotainment system module. A telematics control module 130 may include an in-vehicle modem configured to access communications services of a communications network (not shown), and may provide packet-switched network services (e.g., Internet access, voice over Internet protocol (VoIP) communication services) to the information display system 104 and to other devices connected over the in-vehicle bus 120. The telematics control module 130 may be configured to communicate with a remote device or portable device such as a mobile phone, tablet, watch, personal portable device, remote server, or other electronic system. The communication may be used to transfer information to the processor or controller. The information may be data indicative of a planned route, a planned change in elevation, or an updated friction coefficient for brake material. A navigation system 132 may be configured to, upon entering a destination, route a path from a current location to the destination. Based on the path, the navigation system 132 may perform routing and display functions such as displaying the path, tracking vehicle movement, tracking changes in a speed of the vehicle, and tracking changes in an elevation of the vehicle, along with predicting changes in a future speed of the vehicle, and predicting changes in a future elevation of the vehicle based on the path. The current location may be determined by a global positioning system (GPS) module 134. The GPS module 132 may be in communication with remote satellites enabling the GPS module to predict changes in a future speed of the vehicle 102, and predict changes in a future elevation of the vehicle 102 based on a current vehicle location, a vehicle heading and map data indicative of a current road the vehicle is traveling on.

A display application 136 may be installed to the information display system 104 and utilized to allow the vehicle 102 to provide output to the display controller 118, such that the configurable display 114 conveys the information relating to the operation of the vehicle 102 to the driver. In an example, the display application 136 may be configured to provide a menu structure via the configurable display 114 having set of categories into which information screens are placed, such as performance, truck, towing, mountain passes, and off-road. The menu structure may further include information screens that may be selected from the categories. For instance, the performance category may include a lap counter screen for a time split between consecutive laps along a closed course, a g-force screen for lateral acceleration, and a brake capacity screen. As more examples, the truck information category may include a gauge selection screen, a tire pressure screen, a digital speedometer screen, an engine information screen, and a brake capacity screen. As some further examples, the towing category may include a towing status screen, a towing information screen, a trailer light status screen, a trailer setup screen, a connection checklist screen, and a brake capacity, and the off-road category may include an off-road status screen, a vehicle inclination screen, a power distributions screen, and a brake capacity screen. When a screen is selected from the menu structure (e.g., via user input to the HMI controls 116), the selected screen may be provided on the configurable display 114. Also, a display may be used in conjunction with mechanical needles such as having shafts of gauges at a peripheral of the display whereas the needles are configured to extend over the display. The display may then be configured as a faceplate to the gauges. Here, the display may change to match the desired vehicle characteristic displayed by the gauge/display combination.

Figure 2:
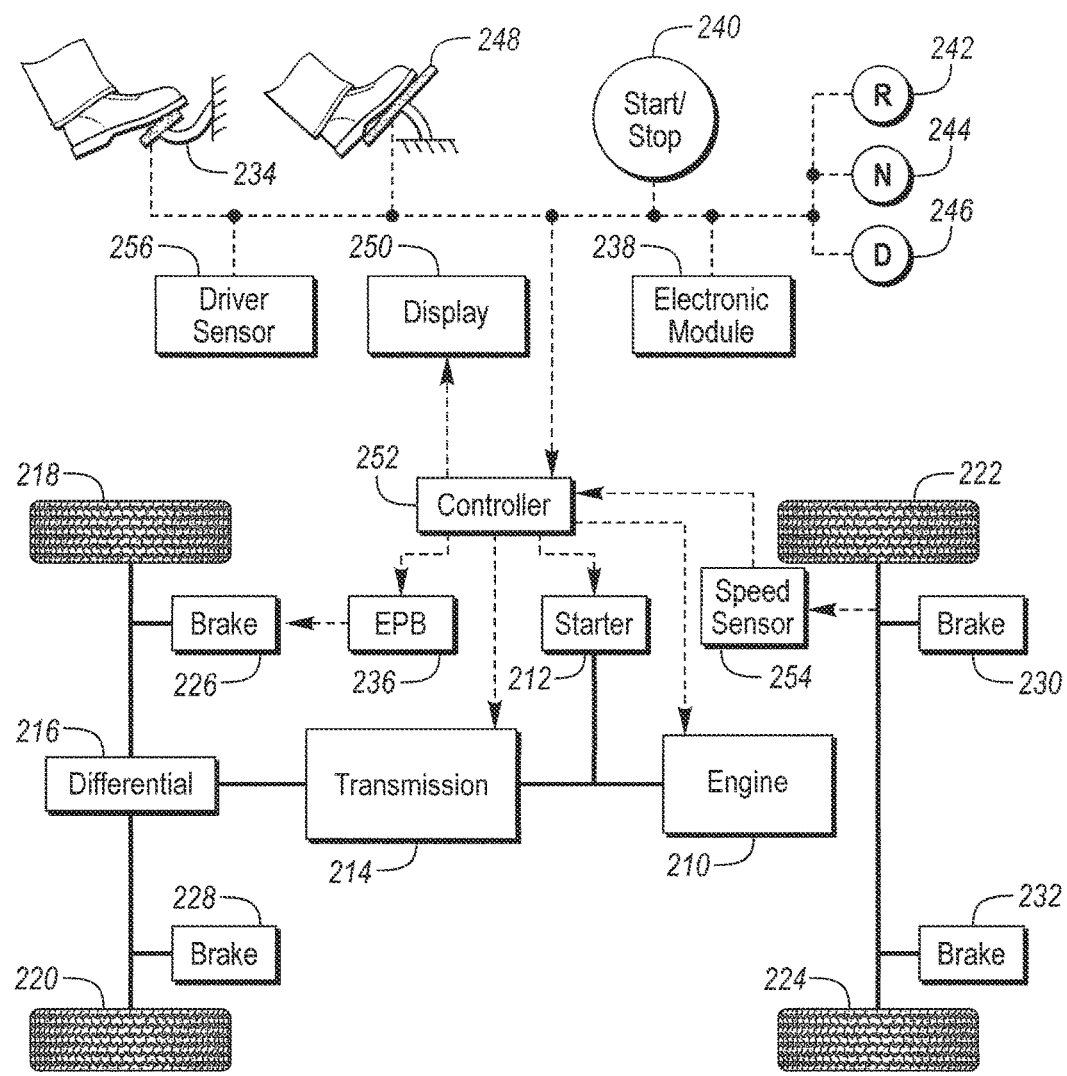
FIG. 2 illustrates a schematic diagram of a vehicle powertrain and control systems for the powertrain.

FIG. 2 schematically illustrates a rear wheel drive vehicle powertrain and driver interface. Bold solid lines represent mechanical power flow connections such as shafts. Dashed lines represent the flow of information signals. For clarity, power flow paths and signals not impacted by the present invention may be omitted from Figures. Engine 210 generates power by burning fuel. Starter 212 uses electrical energy from a battery to accelerate the engine to a speed at which the combustion process can be sustained. Transmission 214 establishes a variety of power flow paths with various speed and torque ratios between the engine crankshaft and a transmission output shaft to adapt the power to current vehicle needs. Differential 216 splits the power from the transmission output shaft between left and right rear wheels 218 and 220, permitting slight speed differences such as when the vehicle turns a corner. Front wheels 222 and 224 are not powered. A four wheel drive powertrain may include a transfer case which diverts some or all power from the transmission output shaft to the front wheels. A front wheel drive powertrain drives the front wheels as opposed to the rear wheels. In a front wheel drive powertrain, the transmission and differential may be combined into a single housing.

Brakes 226, 228, 230, and 232 selectively restrain wheels 218, 220, 222, and 224 respectively. Typically, the brakes are engaged in response to a driver depressing brake pedal 234. The torque capacity of the brakes varies in response to the degree of pedal depression and/or the force exerted on pedal 234. Electronic Park Brake (EPB) 236 may be engaged to hold the current level of torque capacity of at least one of the brakes even after brake pedal 234 is released. Transmission 214 also includes a park mechanism. A park mechanism is a mechanism designed to hold the vehicle stationary for an indefinite period without consuming any power. Typically, the park mechanism includes a park pawl which engages a park gear on the transmission output shaft. The park pawl is generally not designed to engage the park gear when the vehicle is moving at a speed higher than a relatively low threshold speed. The park mechanism may include features to delay engagement if the mechanism is triggered at a speed higher than the threshold speed.

A driver controls the operation of the powertrain by interacting with various controls. As discussed below, the driver controls the starting and stopping of the engine by manipulating ignition controls including electronic modules 238 and start/stop button 240. The driver selects the desired direction of motion (or neutral) using a range selector such as a reverse button 242, a neutral button 244, and a drive button 246. Notably, the range selector does not provide for direct, explicit selection of Park. Once a driver range is selected, the driver controls the wheel torque using accelerator pedal 248 (for positive torque) and brake pedal 234 (for negative torque). Feedback regarding the current status of the powertrain is provided to the driver by display 250.

Controller 252 sends signals to control various powertrain components based on driver manipulation of the controls list above and on other sensors. These other sensors may include a vehicle speed sensor 254 and a driver presence sensor 256. The driver presence sensor may be configured to detect weight in the driver's seat, similar to a passenger sensor used to control activation of passenger side air bags.

The control algorithms are described below and in several Figures showing flowcharts. The control algorithms are described as multiple communicating controllers but may be implemented in a variety of ways, including multiple processors, a single controller executing several control threads, or a single processor executing a single control thread. In the flow charts, control states are represented by rounded corner boxes. For each flowchart, one state is active at a time. Various events trigger execution of actions as indicated by labelled arrows leading away from the state boxes. These events may be changes of state in other flowcharts or may be sent from sensors in response to driver actions or changes in vehicle status. Square corner boxes represent actions taken by the controller. Diamonds represent logic branch points. Event handling logic may result in a transition to another state but does not always do so. Transitions to other states may trigger events in other flowcharts.

Figure 3:
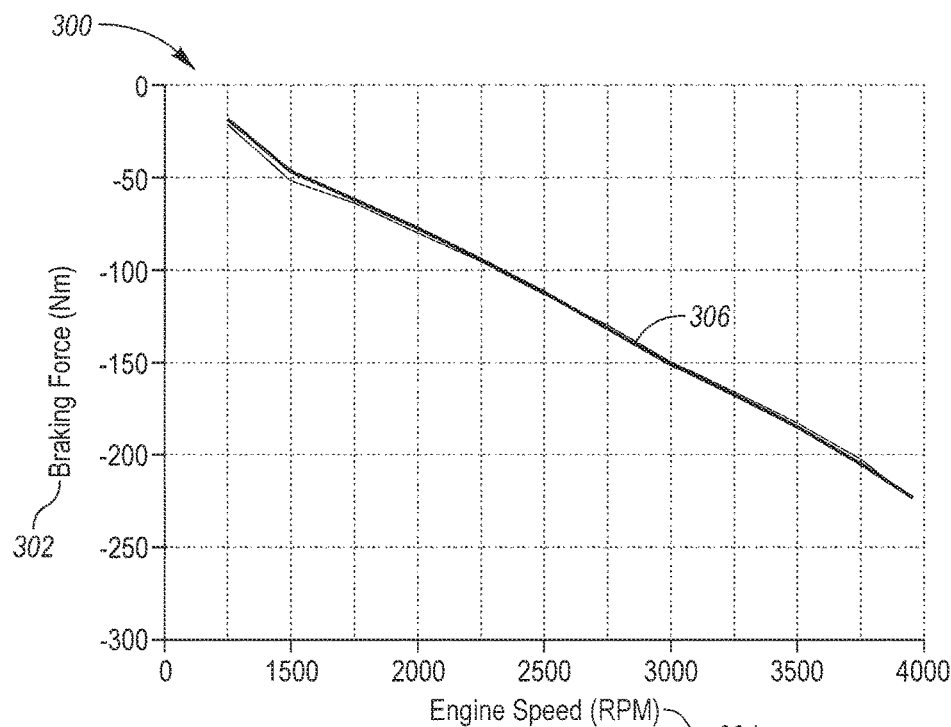
FIG. 3 illustrates a graphical representation of engine brake horsepower with respect to engine speed at engine crankshaft.

FIG. 3 illustrates a graphical representation 300 of engine braking Force 302 with respect to engine speed 304 at the crankshaft of the engine. The engine braking force 302 is also referred to as a negative torque, and is the amount of energy required to spin the internal combustion engine (ICE). The spinning of the ICE produces a negative torque due to compression of air in the cylinders of the engine, the rotational mass of the engine, and friction losses associated with the engine. Although engine braking is associated with rotation of the engine and thus a function of engine rotational speed 304, as shown in the profile 306 of negative torque 302 vs. engine rotational speed 304, a transmission may be used to multiply the effects of engine braking.

Figure 4:
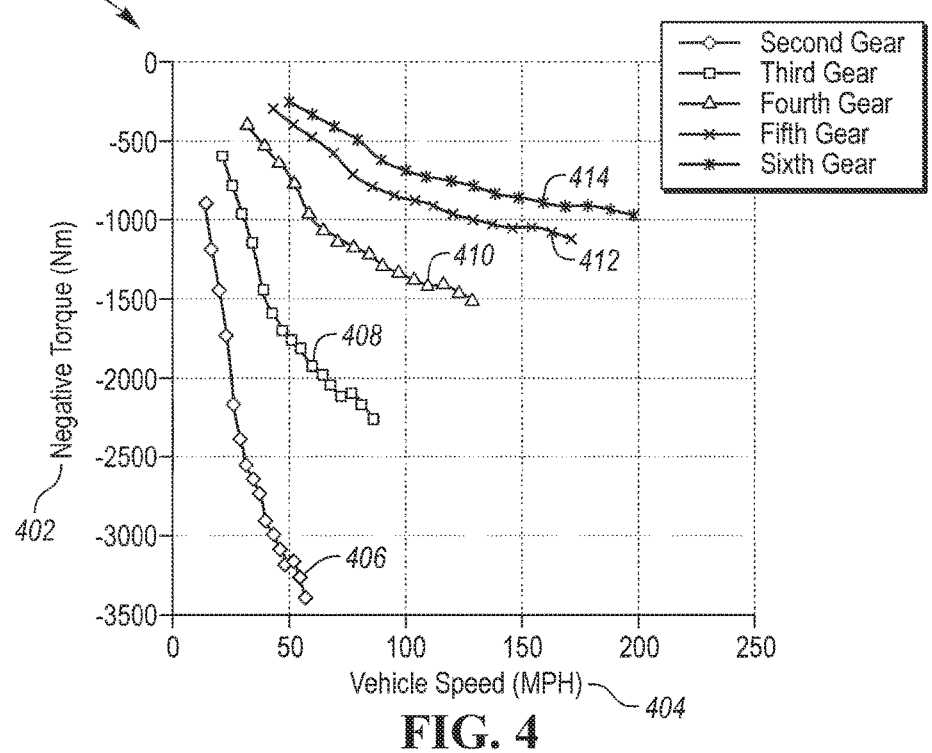
FIG. 4 illustrates negative torque at the wheel with respect to vehicle speed for different transmission gears.

FIG. 4 illustrates a graphical representation 400 of negative torque 402 at the wheel of the vehicle with respect to vehicle speed 404 for different transmission gears. Here, based on an engine operating range of approximately 1250 rpm to 4000 rpm (as shown in FIG. 3), each gear multiplies the negative torque of the engine. Here, a transmission is shown with the following gear ratios: $2^{nd}$ gear is 2.25, $3^{rd}$ gear is 1.5, $4^{th}$ gear is 1.0, $5^{th}$ gear is 0.75 and $6^{th}$ gear is 0.65. The rear differential is a 3.73 ratio differential and the tire circumference translates 500 revolutions into a mile. The ratio of the differential and the gear is used to multiply the engine braking also referred to as negative torque of the engine to a negative torque at the wheel. Another aspect of the gear ratio is that the gearing reduces the wheel speed range associated with the operating range of the engine. For example, in second gear, the wheel speed is about 14 mph at 1000 RPM and 57 mph at 4000 rpm, and the negative torque increases from −900 nm at 14 mph to −3300 nm at 57 mph. The practical impact of this is that downshifting a transmission increases the negative torque at the wheel and can be used to augment friction brakes. For example, a vehicle traveling at 60 mph the engine braking is multiplied by the gear ratio such that in $6^{th}$ gear there is approximately −344 nm of negative torque, downshifting to $5^{th}$ gear increases the negative torque to −482 nm of negative torque, downshifting to $4^{th}$ gear increases the negative torque to −963 nm, downshifting to $3^{rd}$ gear increases the negative torque to −1933 nm, and downshifting to $2^{nd}$ gear increases the negative torque to −3400 nm. However in $6^{th}$ gear the engine will be rotating at approximately 1200 rpm, in $3^{rd}$ gear, the engine will be rotating at 2800 rpm, and in $2^{nd}$ gear the engine would be rotating at over 4000 RPM which is beyond the recommended speed for the engine of FIG. 3. Therefore, downshifting from $6^{th}$ gear to $3^{rd}$ gear increases the negative torque by over 400% thereby reducing the demand of the friction brakes.

Figure 5:
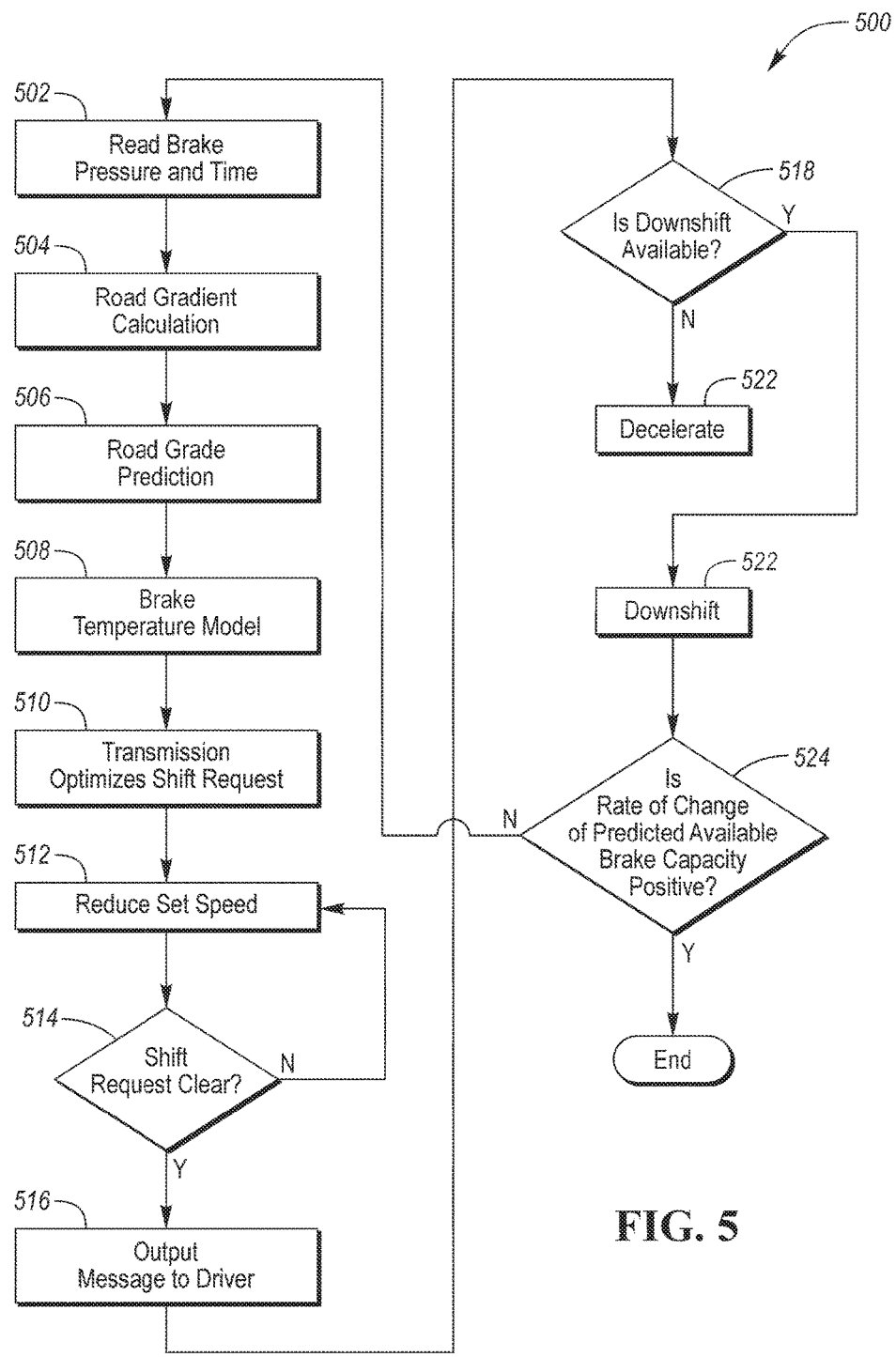
FIG. 5 illustrates a flow diagram of a control system to change a cruise control setpoint based on predicted brake fade.

FIG. 5 illustrates a flow diagram 500 of a control system configured to change a cruise control setpoint based on predicted brake fade.

In operation 502, a controller receives a brake pressure signal and a time associated with the brake pressure signal. Next the controller in operation 504 receives a road gradient. The road grade may come from a powertrain controller, a transmission controller, an inclinometer, or may be calculated based on input from vehicle modules and sensors.

In operation 506, the controller receives a road grade prediction. The road grade prediction may be based on a predicted future route. The predicted road grade may include a predicted change in elevation along a road that the vehicle is currently traveling, or a predicted road grade along a route the vehicle is expected to travel based on data from a navigation system. Also, the predicted road grade may be a predicted change in elevation associated with a route the vehicle is expected to travel based on data from a remote server received by a vehicular embedded modem.

The predicted route of travel may include locations in which a vehicle is expected to apply brakes such as at a stop sign, a traffic light, a location having historical slower speed, or a location associated with real-time traffic congestion. The predicted brake fade threshold may decrease as a speed of the vehicle increases, as the weight of the vehicle increases, as angle of inclination decreases (i.e., traversing down a hill or grade), or as a predicted route is indicative of application of brakes for a duration increases.

In operation 508, the controller, based on brake pressure and time data, along with a temperature of the brakes, determines available brake capacity. The increase or decrease of the brake temperature may be based on a signal from a thermocouple configured to measure a temperature of the brake material, it may be based on detection of light such as infrared light indicative of a temperature of the brake material, or it may be based on a brake model. The brake model may be based on many factors including ambient temperature, brake fluid pressure, brake force, brake duration, rotor design, brake material, friction coefficients, angle of inclination, and vehicle weight. The vehicle weight may be entered by the driver, or determined by a suspension system of the vehicle or a powertrain control module (PCM), an engine control module (ECM), or a transmission control module (TCM). Also, the vehicle weight may include a weight of a trailer coupled with the vehicle. The presence of a trailer may be determined by a tow/haul button or the detection of a trailer lights. Along with the presence of a trailer is the determination of trailer brakes, in which the brake model may compensate for the use of trailer brakes.

The thermocouple sensor may provide a temperature of all four brakes or some combination of brakes (e.g., one front and one rear brake or two front brakes). A brake temperature signal from the thermocouple may be an average of all thermocouple inputs or a highest reported temperature. The signal may be sent on a vehicle bus such as the CAN bus.

The model may also be able to compensate for a stuck or sticky brake caliper. Here, the available brake capacity is an amount of braking available to increase the brakes from the brake temperature to a predicted brake fade threshold. Also, the predicted brake fade threshold may increase or decrease based on factors including a speed of the vehicle, an angle of inclination, a predicted route of travel, or a predicted change in elevation. The predicted route of travel may include locations in which a vehicle is expected to apply brakes such as at a stop sign, a traffic light, a location having historical slower speed, or a location associated with real-time traffic congestion. If the brake capacity drops below a lower threshold, the controller in operation 510 may request a downshift to reduce the stopping demand of the friction brakes.

Based on the current speed of the vehicle, the predicted road grade, the mass of the vehicle, and other factors, the controller may reduce, or utilizing the display prompt the driver to reduce, the set speed in operation 512. Reducing the set speed may result in an anti-lock braking system (ABS) snubbing the brakes to reduce the speed such that a downshift can be performed in which the engine RPM at the lower gear is outside a maximum RPM limit of the engine. If the controller prompts the driver to reduce set speed, the display could display a message such as "Reduce Set Speed to Preserve Brakes" or alternatively, a predefined display icon. If the controller automatically reduces set speed, it may use several methods. One method is to decrement set speed by set amounts, say 1 MPH, until the resultant engine RPM is low enough to allow a downshift. Another method would be to calculate the maximum set speed at the next lower gear, utilizing the target gear and axel ratios, and reduce the set speed accordingly. Once the vehicle set speed has been achieved, the controller would then shift into the lower gear, gaining the additional engine braking torque as illustrated in FIG. 4. This process can be iterative and can be employed by the controller as often as necessary to maintaining optimal vehicle speed on downhill grades while utilizing as little friction braking as possible.

In operation 514, the controller verifies that a downshift can be performed in which the engine RPM at the lower gear is less than a maximum RPM limit of the engine. The controller may make sure that the engine RPM at the lower gear is less than a predetermined guard band from the maximum RPM limit of the engine. For example, if the maximum RPM of the engine is 4000, the controller may limit the maximum RPM to 500 RPMs less than the maximum or 3500 RPMs. If the controller determines that the engine RPM at the lower gear is above the predetermined guard band from the maximum RPM limit of the engine, the controller may branch to operation 512 and reduce the setpoint further and snub the brakes. If the controller determines that the engine RPM at the lower gear is less than the predetermined guard band from the maximum RPM limit of the engine, the controller may proceed to operation 516.

In operation 516, the controller may output a message in the vehicle. For example, a truck or passenger vehicle may output a message "Reducing Cruise Speed to Avoid Brake Fade". A sports car or operation in a performance mode may output a message "Optimal Brake Temperature Reached—Reducing Cruise Speed". A hybrid vehicle, an electric vehicle, or a vehicle with a manual transmission may output a message "Select a Lower Gear to Avoid Brake Fade" or "Downshift to Avoid Brake Fade". A secondary threshold may also be used and a message upon reaching the secondary threshold may include "Brake Fade Imminent—Stop Safely Now".

In operation 518, the controller may determine if the engine RPM at the lower gear is above the predetermined guard band from the maximum RPM limit of the engine, the controller may branch to operation 522 and reduce the vehicle speed using the friction brakes. If the controller determines that the engine RPM at the lower gear is less than the predetermined guard band from the maximum RPM limit of the engine, the controller may proceed to operation 522 and downshift the transmission.

In operation 524, the controller determines a rate of change of predicted brake capacity. A positive rate of change of predicted brake capacity is indicative of an increase in brake capacity and is desired when the predicted brake capacity falls below a lower threshold. If the rate of change of predicted brake capacity is negative, the controller may branch to the beginning at operation 502 to reassess the braking conditions.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A cruise control system for a vehicle comprising:
a controller configured to maintain a speed of the vehicle about a setpoint, and in response to predicted brake capacity falling below a threshold based on predicted brake fade, reduce the setpoint and downshift a transmission of the vehicle to increase negative torque to reduce brake fade.

2. The cruise control system of claim 1, wherein the predicted brake capacity is derived from a temperature of friction material of a brake and predicted brake fade derived from a speed, mass, and current angle of inclination of the vehicle.

3. The cruise control system of claim 1, wherein the predicted brake capacity is further derived from an expected change in elevation along a predetermined route.

4. The cruise control system of claim 1, wherein the predicted brake capacity is further derived from an expected brake force required along a predetermined route.

5. The cruise control system of claim 1, wherein the predicted brake capacity is further derived from an expected change in elevation associated with a current location and a direction of travel.

6. The cruise control system of claim 1, wherein the controller is further configured to output the predicted brake capacity based on a brake material coefficient characterized by historical changes in a temperature of friction material associated with a brake force and brake duration.

7. The cruise control system of claim 6, wherein the temperature of friction material is an output from a thermocouple or a result of a brake model.

8. The cruise control system of claim 6, wherein the controller is further configured to output a warning if the predicted brake capacity is less than the threshold or the temperature of friction material exceeds a predicted brake fade threshold.

9. The cruise control system of claim 6, wherein the predicted brake capacity is based on a difference between the predicted brake fade and the temperature of friction material.

10. A powertrain of a vehicle comprising:
an engine;
an automatic transmission coupled with the engine; and
a controller configured to maintain a speed of the vehicle about a setpoint, and in response to a predicted brake capacity falling below a threshold based on predicted brake fade, reduce the setpoint and downshift the transmission to increase a negative torque.

11. The powertrain of claim 10, wherein the predicted brake capacity is based on a temperature associated with a friction material of a brake of the vehicle and a predicted brake fade threshold derived from a speed, mass, and current angle of inclination of the vehicle.

12. The powertrain of claim 10, wherein the predicted brake fade is further derived from an expected brake force required along a predetermined route.

13. The powertrain of claim 10, wherein the predicted brake fade is further derived from an expected change in elevation associated with a current location and a direction of travel of the vehicle.

14. The powertrain of claim 10, wherein the predicted brake fade is further based on a brake material coefficient characterized by historical changes in brake temperature associated with a brake force and brake duration.

15. A method of controlling a powertrain of a vehicle comprising:
in response to a predicted capacity of vehicle brakes decreasing below a predetermined level,
reducing, by a controller, a vehicle speed setpoint,
applying friction brakes of the vehicle to reduce the vehicle speed to the setpoint, and
downshifting a transmission, wherein the predicted capacity is based on a temperature associated with a friction material of the vehicle brakes and a predicted brake fade threshold derived from a speed, mass, and current angle of inclination of the vehicle.

16. The method of claim 15, wherein the predicted capacity of vehicle brakes is further based on a brake material coefficient.

17. The method of claim 15, wherein the capacity of vehicle brakes is based on a difference between the temperature and predicted brake fade threshold.

18. The method of claim 15, wherein the predicted brake fade threshold is further derived from an expected change in elevation associated with a current location and a direction of travel.

19. The method of claim 15, wherein the predicted brake fade threshold is further derived from an expected brake force required along a predetermined route.

20. The method of claim 15, wherein the predicted brake fade is based on an integral of a brake pressure.

* * * * *